United States Patent
Tan et al.

(10) Patent No.: US 7,523,220 B2
(45) Date of Patent: Apr. 21, 2009

(54) METASPACE: COMMUNICATION MIDDLEWARE FOR PARTIALLY CONNECTED MOBILE AD HOC NETWORKS

(75) Inventors: Kun Tan, Beijing (CN); Qian Zhang, Beijing (CN); Wenwu Zhu, Basking Ridge, NJ (US)

(73) Assignee: Microsoft Corporation, Redmond, WA (US)

( * ) Notice: Subject to any disclaimer, the term of this patent is extended or adjusted under 35 U.S.C. 154(b) by 907 days.

(21) Appl. No.: 10/664,354

(22) Filed: Sep. 17, 2003

(65) Prior Publication Data

US 2005/0068913 A1    Mar. 31, 2005

(51) Int. Cl.
*G06F 15/173* (2006.01)
*H04B 7/00* (2006.01)
*H04Q 7/24* (2006.01)
*H04L 12/28* (2006.01)
*H04L 12/54* (2006.01)

(52) U.S. Cl. .................. 709/243; 709/224; 370/400; 370/310; 370/338; 370/428

(58) Field of Classification Search ................ 709/238, 709/228, 246, 220, 243, 224; 370/310, 338, 370/400, 428
See application file for complete search history.

(56) References Cited

U.S. PATENT DOCUMENTS

| | | | | |
|---|---|---|---|---|
| 5,987,011 | A * | 11/1999 | Toh | 370/331 |
| 6,130,881 | A * | 10/2000 | Stiller et al. | 370/238 |
| 6,876,643 | B1 * | 4/2005 | Aggarwal et al. | 370/338 |
| 6,922,725 | B2 * | 7/2005 | Lamming et al. | 709/227 |
| 6,937,602 | B2 * | 8/2005 | Whitehill et al. | 370/395.54 |
| 7,035,207 | B2 * | 4/2006 | Winter et al. | 370/225 |
| 7,200,674 | B2 * | 4/2007 | Sapuram et al. | 709/238 |
| 7,280,545 | B1 * | 10/2007 | Nagle | 370/400 |
| 7,349,360 | B2 * | 3/2008 | Gutierrez et al. | 370/315 |
| 2004/0266439 | A1 * | 12/2004 | Lynch et al. | 455/444 |

OTHER PUBLICATIONS

Jae-Hwan Change and Leandros Tassiulas; Fast Approximate Algorithms for Maximum Lifetime Routing in Wireless Ad-hoc Networks; 2000; 12 pages; Springer-Verlag Berlin Heidelberg Germany.
Ahuja et al., "Linda and friends," *Computer*, vol. 19, Issue 8 (Aug. 1986), pp. 26-34.
Box et al., "Simple Object Access Protocol (SOAP) 1.1," W3C Note May 8, 2000, 35 pgs.
Extensible Markup Language (XML) 1.0 (Third Edition), W3C Recommendation Feb. 4, 2004, 60 pgs.
Bloom, "Space Time Trade-offs in Hash Coding with Allowable Errors," Jul. 1970, pp. 422-426.
Moy, RFC 1247 (RFC1247)—OSPF Version 2, Jul. 1991, 137 pgs.

* cited by examiner

*Primary Examiner*—Kevin Bates
(74) *Attorney, Agent, or Firm*—Lee & Hayes, PLLC

(57) ABSTRACT

A system is presented for providing a middleware communication space that provides asynchronous message delivery service for partially connected mobile ad hoc networks. Embodiments of the present invention use mobile devices to bridge separated islands of networks and store and propagate messages. The system and software architecture supports methods for messaging caching, transferring and routing. More specifically, embodiments provide methods and systems that extend a communication space concept into a distributed environment and combine it with the standard Web Services technologies, i.e, SOAP, and WS series protocols. The communication space provides an extension of Web Services to mobile ad hoc networks and provides asynchronous message caching, transferring and routing.

8 Claims, 6 Drawing Sheets

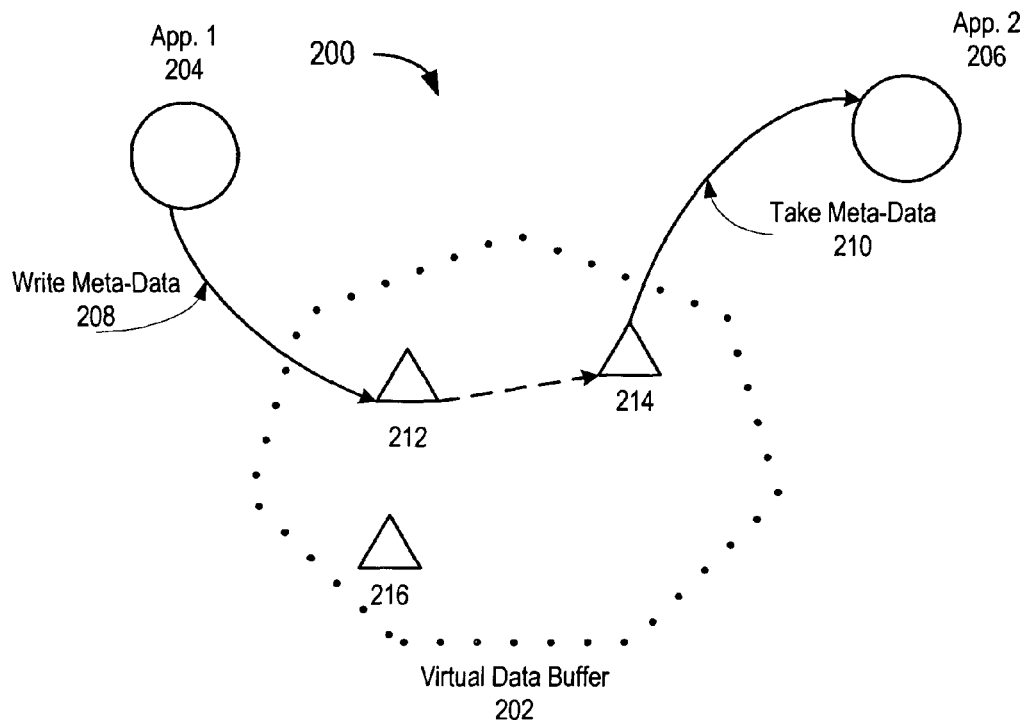
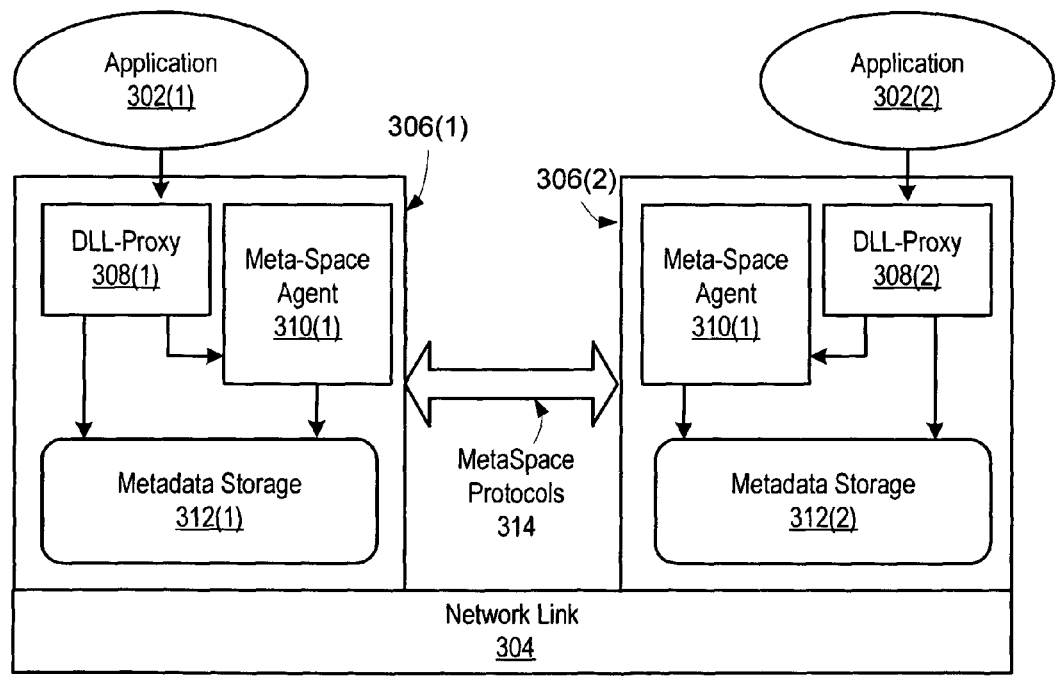

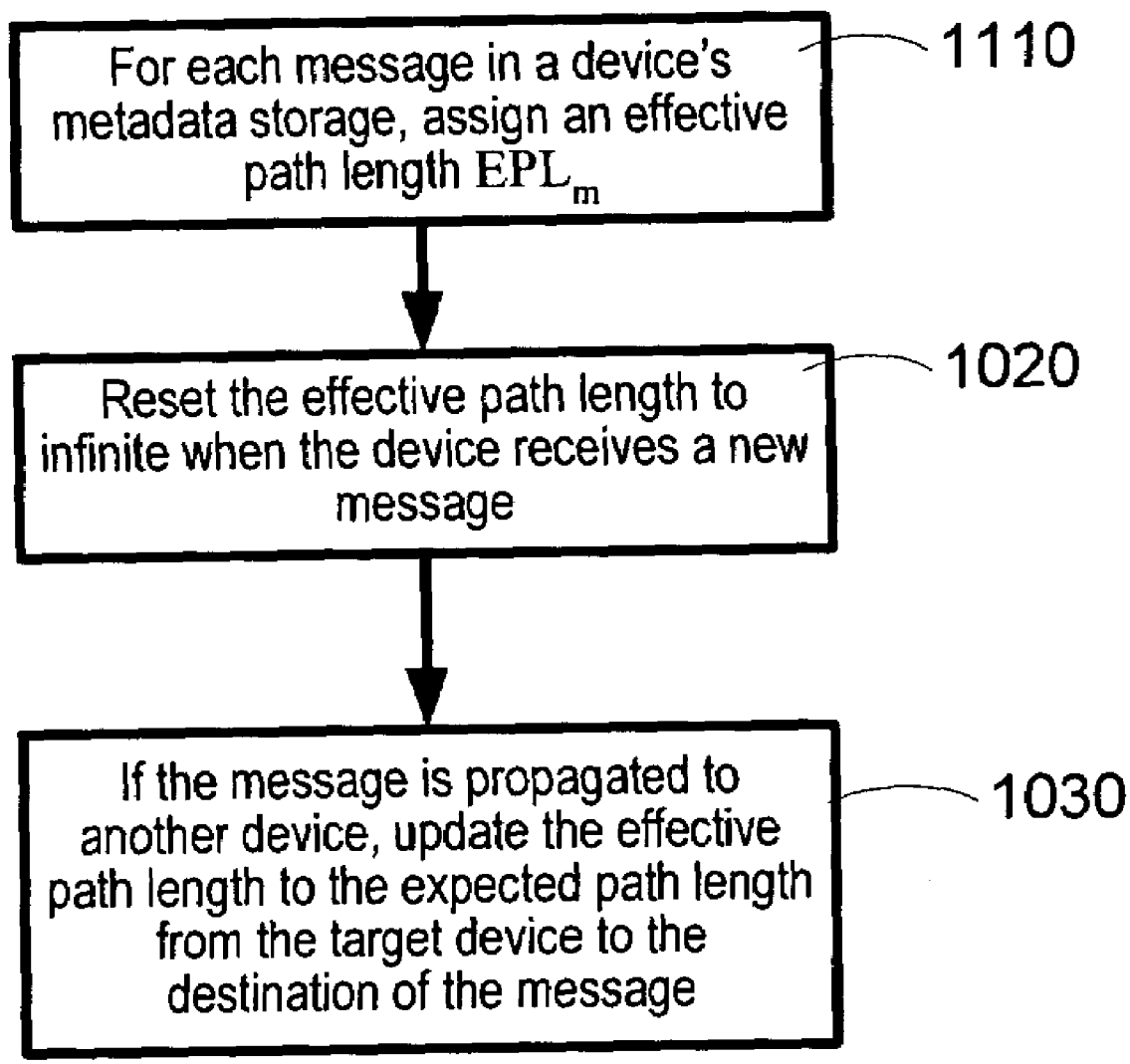

METASPACE: COMMUNICATION MIDDLEWARE FOR PARTIALLY CONNECTED MOBILE AD HOC NETWORKS

FIELD OF THE INVENTION

This invention relates generally to networked computer systems and, more particularly, relates to a communication middleware for partially connected mobile ad hoc computer networks.

BACKGROUND OF THE INVENTION

Distributed applications are important for the future of computer networks because they enhance efficiency. Current distributed systems either assume highly available servers or highly available network connections. Coordinating distributed applications is problematic for ad hoc wireless systems because the entire ad hoc network capacity is constrained. Distributed applications are especially problematic to coordinate for smaller, but so-called "smart devices" such as cellular phones, personal digital assistants (PDAs), and laptops that can interact with sensors and controllers and other environmental objects. The connectivity of such devices and objects can be, for example, BlueTooth or IEEE 802.11. Power limitations, radio coverage and the geography distribution of cooperating nodes often prevent an end-to-end path for ad hoc nodes. In general, ad hoc routing methods assume an end-to-end path that connects communication nodes and focus on locating an existing path, such as a series of intermediate nodes connecting cooperating devices. Many applications, such as those requiring real-time communication, require a fully connected path to transfer sequential packets in a timely manner. Other applications do not require a fully connected path and can exist in highly partitioned networks with eventual message delivery. Such applications include personal data/information management, news information propagation and personally messaging. Such applications require only asynchronous messaging service. Known methods provide that if there is no path, communication fails.

The current methodologies for ad hoc networks coordinating distributed applications would benefit from avoidance of requiring end-to-end paths of communication nodes.

BRIEF SUMMARY OF THE INVENTION

Accordingly, a system for providing a communication middleware, named Metadata Space (MetaSpace), which is designed to provide asynchronous message delivery service for partially connected mobile ad hoc networks. Embodiments of the present invention use mobile devices to bridge separated islands of networks. These mobile devices work as carriers that store and propagate messages.

One embodiment is directed to a system and software architecture that supports methods for messaging caching, transferring and routing. More specifically, embodiments provide methods and systems that extend a communication space concept into a distributed environment and combine it with the standard Web Services technologies, i.e, SOAP, and Web Service (WS) series protocols. The communication space, referred to as "MetaSpace" provides an extension of Web Services to mobile ad hoc networks. Another embodiment is directed to methods for providing asynchronous message caching, transferring and routing.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, can be best understood from the following detailed description taken in conjunction with the accompanying drawings of which:

FIG. 2 is a block diagram of a virtual data buffer in a communication space according to an embodiment of the present invention.

FIG. 3 is a block diagram of a middleware environment, MetaSpace in accordance with an embodiment of the present invention.

FIG. 11 is a flow diagram illustrating a method for a device to determine an effective path length in accordance with an embodiment of the present invention.

DETAILED DESCRIPTION OF THE INVENTION

Figure 1:
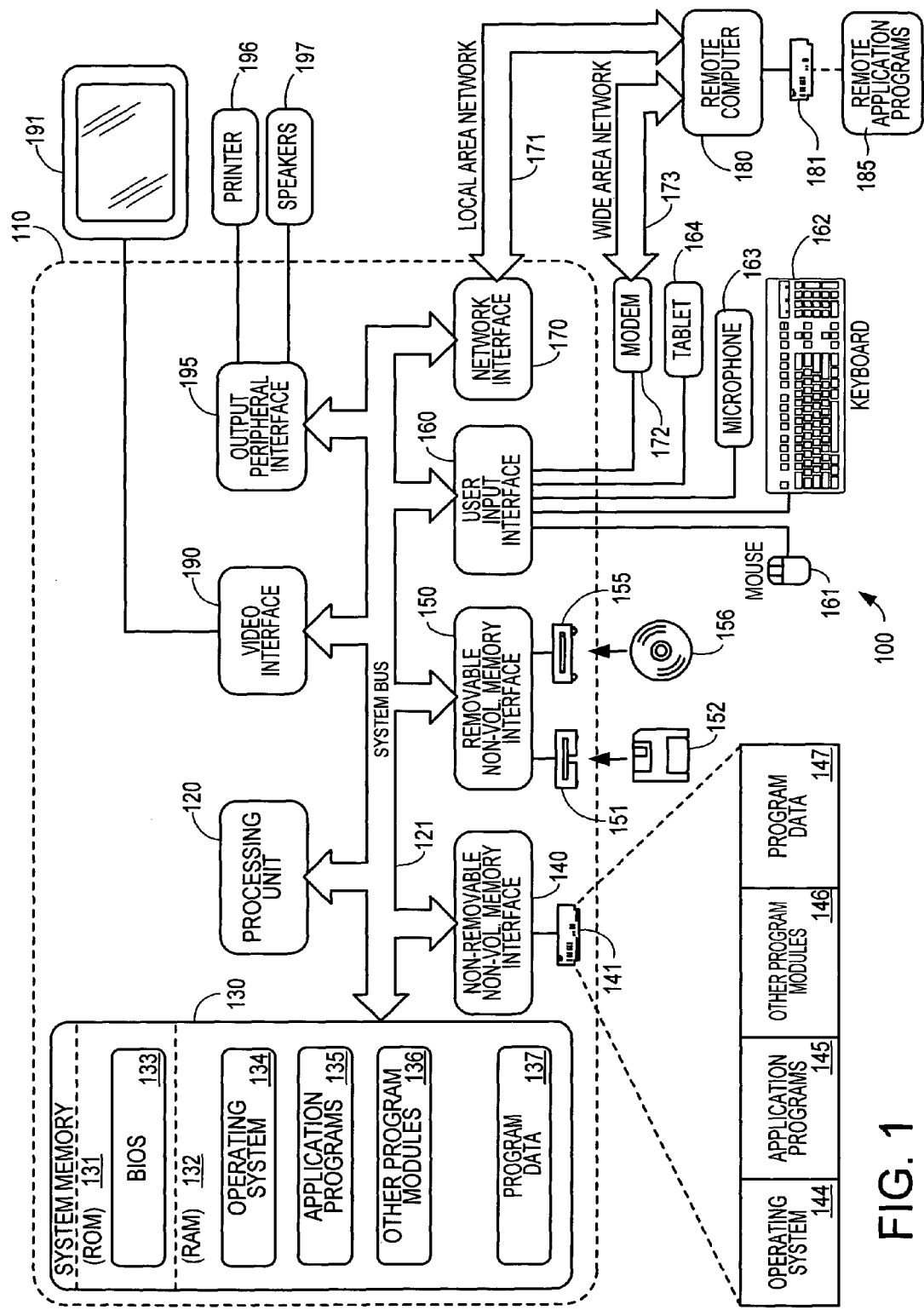
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in: the present invention, the computer system 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Embodiments of the present invention are directed to coordinating distributed applications in a mobile ad hoc environment spanning multiple platforms and heterogeneous devices. Referring to FIG. 2, a block diagram illustrates a middleware environment for an ad hoc environment, hereinafter referred to as "MetaSpace." MetaSpace can include a virtual data buffer 202, capable of coordinating distributed applications , such as application 204 and 206. Application 204 is shown sending 208 metadata to virtual data buffer 202 and application 206 is shown receiving metadata 210. Collectively, MetaSpace 200 provides an abstraction for a virtual shared communication buffer for applications 204 and 206, which can reside on various devices or nodes. Nodes in MetaSpace 200 are shown as nodes 212, 214 and 216.

In one embodiment, MetaSpace 200 provides two software services. First, one service can be providing an asynchronous message communication service between applications located on different devices or nodes, placing no pre-assumption on the existence of a network connection between the different nodes. Another service can include a service that allows data sharing among applications scattered across many nodes.

Unlike known space-based systems, MetaSpace 200 does not rely on highly available servers that contain an entire space or on a highly available infrastructure network that connects different nodes. MetaSpace 200 maintains virtual data buffer 202 as a shared buffer in a distributed fashion. Therefore, MetaSpace 200 can provide a framework for data storage, routing, and transferring. MetaSpace 200 can be implemented as a light-weighted middleware component designed to run on resource restricted devices like Pocket PC and Smart Phones.

In one embodiment, MetaSpace 200 is based on standard XML Web Service technologies such as SOAP and the like. Advantageously, standard XML Web Service technologies facilitate interoperability and extensibility of MetaSpace 200. For example, by adopting the same message format, an application can invoke a Web Service on the Internet via MetaSpace 200.

Referring now to FIG. 3, software architecture of MetaSpace 200 is illustrated. More specifically, FIG. 3 illustrates the interaction between two MetaSpace environments 306(1-2) on different devices as they establish a pair-wise communication channel, e.g. Bluetooth. Establishing such a pair-wise communication channel can occur when the devices holding MetaSpaces 306(1,2) are in the same vicinity. In one embodiment, a device holding MetaSpace software holds three components in a single device, including metadata storage 312(1-2), MetaSpace Agent 310(1-2) and DLL-proxy 3-8(1-2). Metadata storage 312 can be configured as a container of XML messages (SOAP), structured in a hierarchy. MetaSpace agent 310 can be implemented as the active part of MetaSpace 200. MetaSpace agent 310 can be responsible for interacting with other devices via MetaSpace protocols 314. MetaSpace protocols 314 can guarantee eventual message delivery. MetaSpace agent 310 can also be configured to handle operation requests from applications that use MetaSpace 200 to communicate and share data. The request details can be masked from applications, such as applications 302(1-2) via DLL-proxies 308(1-2). DLL-proxies 308 are linkable libraries and can be configured to provide concise application programming interfaces (APIs) to user applications.

Metadata storage 312 holds metadata as messages, which can be configured as XML messages wrapped as Simple Object Access Protocol (SOAP) messages. The metadata can include Web Service Routing Protocol (WS-Routing) data to define routing information and data appropriate for an extended protocol defined to describe critical information needed for MetaSpace agents 310 to correctly process messages. In one embodiment, the extended protocol data is configured as XML entries.

An example of a XML message stored in MetaSpace 200 is shown below in Table 1:

TABLE 1

```
<ENV:Envelop    xmlns:ENV="http://schemas.xmlsoap.org/soap/
envelop/"
   ENV:encodingStyle ="http://schemas.xmlsoap.org/soap/encoding/" />
   < ENV:Header>
      <m:path xmlns:m="http://schemas.xmlsoap.org/rp/">
         <m:action>metaspace://mymetaspace/homepc/update</m:action>
         <m:to>metaspace://mymetaspace/homepc/</m:to>
         <m:from>metaspace://mymetaspace/officepc/</m:from>
         <m:rev>
            <m:via/>
         </m:rev>
         <m:id>msid:84b9f31@officepc.mymetaspace</m:id>
      </m:path>
      <ms:msprop       xmlns:ms="http://www.metaspace.com/mp"
actor="metaspace://metaspace/agent" >
         <ms:expiratetime>Mon Dec 23 11:49:55 2002</ms:expiratetime>
         <ms:hopLimitation>3</ms:hopLimitation>
         <ms:timestamp>Mon Dec 16 15:12:43 2002</ms:timestamp>
         <ms:namespace>msns://root/common</ms:namespace>
         <ms:adminDomain
ms:domaintype="strict">metaspace://mymetaspace/</
ms:adminDomain>
         <ms:priority>normal</ms:priority>
         <ms:relateTo    ms:relateship="replace">    art-education@
         mymetaspace
      </ms:relateTo>
         <ms:property ms:name="author" >Rukiey</ms:property>
         <ms:property ms:name="version">1.0</ms:property>
      </ms:msprop>
   </ ENV:Header>
   <ENV:Body>
      <!-The message data specific to the application />
   </ENV:Body>
</ENV:Envelop>
```

In one embodiment, MetaSpace 200 extends the SOAP format by adding a new header entry, tagged with msprop under the MetaSpace namespace. The data structures for the data fields can include the following:

ExpirateTime: an expiration time of the message in absolute time. The data are invalid after that point.

HopLimitation: the upper bound of hops that a message can be transferred. The upper bound value decreases by one after a successful transmission.

Timestamp: the wall clock time marking the creation time of the message.

Namespace: identifies the subspace in which the message is placed.

AdminDomain: the domain to which the message is restricted. This field differs from the Namespace field in that adminDomain defines a physical bound of devices which share the same administration privilege, and Namespace is a logical concept. The value is specifically useful for multicast and anycast messages. In these cases, the message propagation is restricted to a certain set of devices and such a restriction prevents unwilling message leaking.

RelateTo: specifies the topic the message is related to. A relationship attribute is provided to define how to act when two messages are related to one particular topic, e.g. "replace" means the newer message would obsolete the older ones.

Priority: defines the priority of a message, e.g. low, normal, or high.

Property: this field is an extensible way for application to define application-specific properties (name-value pair) associated with the message. MetaSpace 200 can be configured to support content-based searches of messages via properties.

Figure 4:
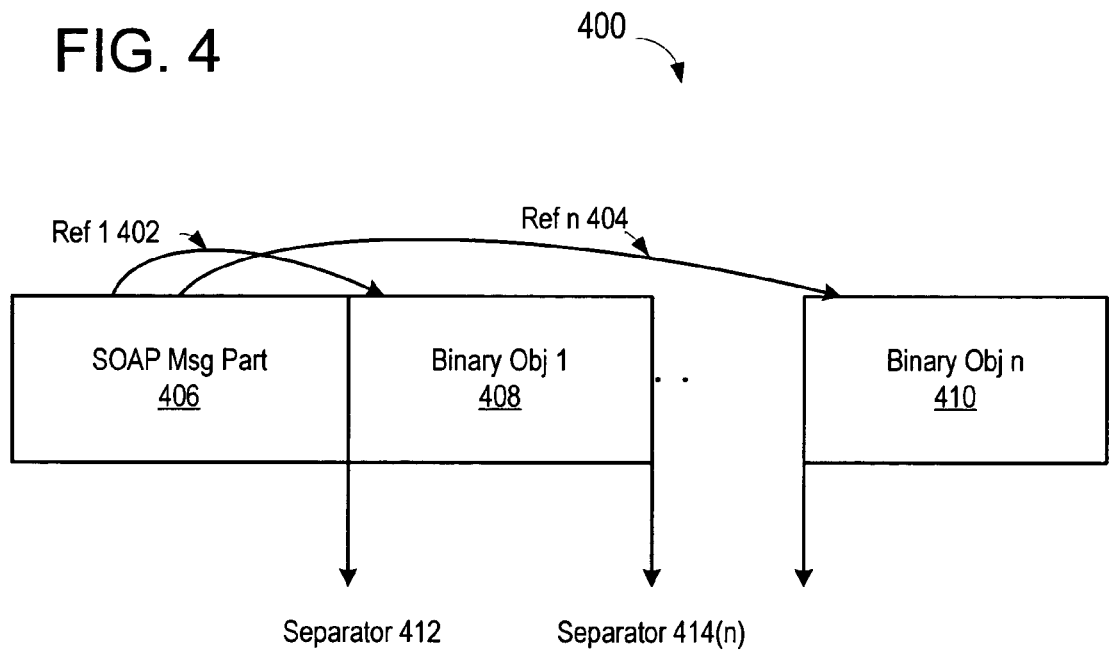
FIG. 4 is a block diagram illustrating a SOAP message with references to binary objects in accordance with an embodiment of the present invention.

Referring now to FIG. 4, MetaSpace 200 can be configured to handle metadata including large binary data. FIG. 4 illustrates a compound object 400 configured to handle binary data. The binary data can be within XML, having data encoded in an ASCII format, e.g. Base64. However, this method is costly. Object 400 illustrates an alternative wherein MetaSpace 200 stores only a reference in an XML message, and stores store binary data elsewhere in raw format. FIG. 4 illustrates a SOAP message part 406 and a binary object 1 408. Message part 406 and binary object 1 408 are separated by separator 412, and binary object 1 408 is separated from additional binary objects by separators 414($n$). SOAP message 406 points to binary object 408 via reference 1 402, and other binary objects n via reference n 404.

FIG. 4 illustrates that the burden of handling multiple objects can be alleviated by using internal references and storing all data (XML message and binary data) in a compound object which can be mapped to a file.

Figure 5:
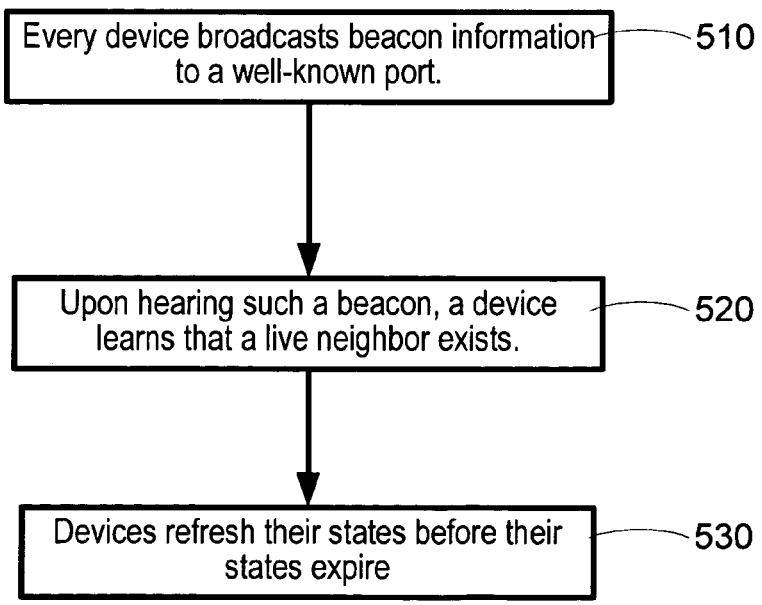
FIG. 5 is a flow diagram illustrating a method for mobile devices to perform discovery.

Referring now to FIG. 5, a flow diagram illustrates a method for MetaSpace 200 to perform device discovery and neighbor maintenance. In an embodiment, MetaSpace 200 uses URIs to identify devices and is not restricted to using any specific scheme of URI. Further, in the embodiment, to identify a receiver, MetaSpace 200 uses a metaspace://domain/device scheme. Schemes other than that can be referred to as an Internet host. Flow diagram 500 illustrates an approach for a device to discover its neighbors based on a listen/announce protocol. Block 510 provides that every device broadcasts beacon information to a well-known port. Block 520 provides that, on hearing such a beacon, a device learns that a live neighbor exists. Each beacon contains a lease field that indicates an expectation of availability time. Block 530 provides that, because the neighbor information is regarded as soft-state, devices refresh their states before their states expire. A typical structure of a beacon is shown in Table 2:

TABLE 2

```
<env:Envelop    xmlns:ENV="http://schemas.xmlsoap.org/soap/
envelop/"
   ENV:encodingStyle ="http://schemas.xmlsoap.org/soap/encoding/" />
   <env:header xmlns:b="http://www.metaspace.com/beacon">
      <b:deviceid>metaspace://domain/devicename</b:deviceid>
      <b:ip>192.168.0.12</b:ip>
      <b:port>2000</b:port>
      <b:lease>60</b:lease> <!-- 60s -->
   <env:header>
</env:Envelop>
```

An internal data structure (hashing map) is constructed to maintain the association between the name of a device and the communication address of MetaSpace agent 310 running on that device.

Figure 6:
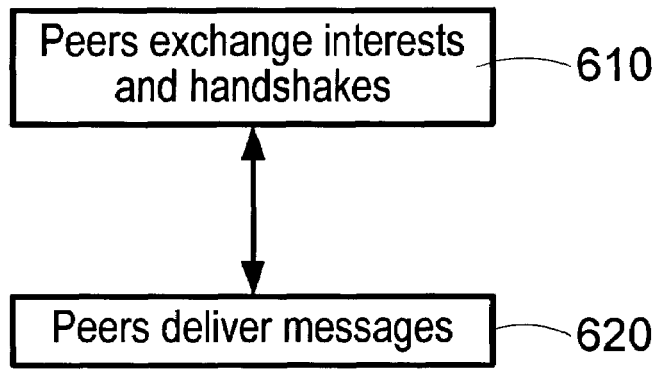
FIG. 6 is a diagram identifying interactions between peers in accordance with an embodiment of the present invention.

Referring now to FIG. 6, a flow diagram illustrates a transfer protocol that specifies how messages are propagated when two devices meet each other in a MetaSpace 200 environment. Each device in MetaSpace 200, such as devices 306 shown in FIG. 3, maintains storage for metadata 312. When transferring messages to a peer, only messages that are unknown are transferred. To do that, FIG. 6 illustrates a two-phase transfer protocol. Block 610 illustrates phase one, and provides that peers exchange interests and handshakes. Block 620 provides that messages are delivered during the exchange.

Figure 7:
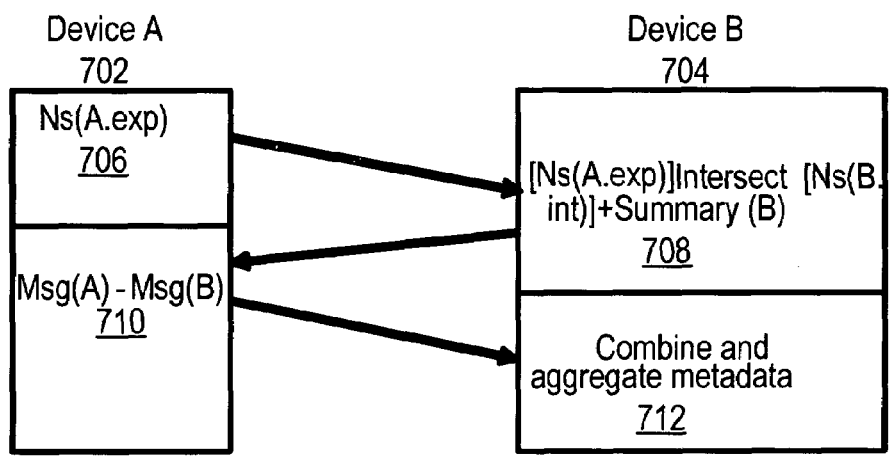
FIG. 7 is a block diagram illustrating interactions between peers in accordance with an embodiment of the present invention.

Referring now to FIG. 7, a push mode of a transfer protocol is illustrated. More specifically, Device A 702 first advertises an exported namespace, Ns(A.exp) 706, to device B 704. Device B 704 calculates the intersection of Device A's 702 exported namespace and its own interests, Ns(A.exp)nNs (B.Int) 708, and then replies to Device A 702 with that intersection as well as a summary of messages that Device B has known under the intersected namespace. In one embodiment, the summary is constructed using a bloom-filter, as is known and an embodiment of which is described below. Upon receiving the reply, Device A 702 starts a message delivery session. By testing the message against the summary, 710, only those unknown to Device B 704 are transferred.

Like the push mode, MetaSpace 200 supports a corresponding pull mode. Like the push mode, the pull mode transfer protocol, not shown, provides the inverse of the mode shown in FIG. 7, thus, a device that will receive data starts the session by sending its interests.

The bloom-filter is a known filter used for efficient traffic flow measurement. In one embodiment, a bloom filter appropriate for MetaSpace 200 can be configured assuming a summary vector length is m. Let H=(H1, H2, H3, H4)=MD5_Hash (msg_id). Each Hi (i=1,2,3,4) is a doubleword. Bit Ki=Hi mod m (i=1,2,3,4) in the summary vector is set. The bloom-filter has certain false positive probability (FPP). However, FPP is rather small in the normal cases, since Pfpp≈(1-e- (4 n/m))4. In a MetaSpace 200 environment, this false positive probability does little harm to metadata transfer because falsely un-transmitted messages may be transferred in a next data transfer session.

Figure 8:
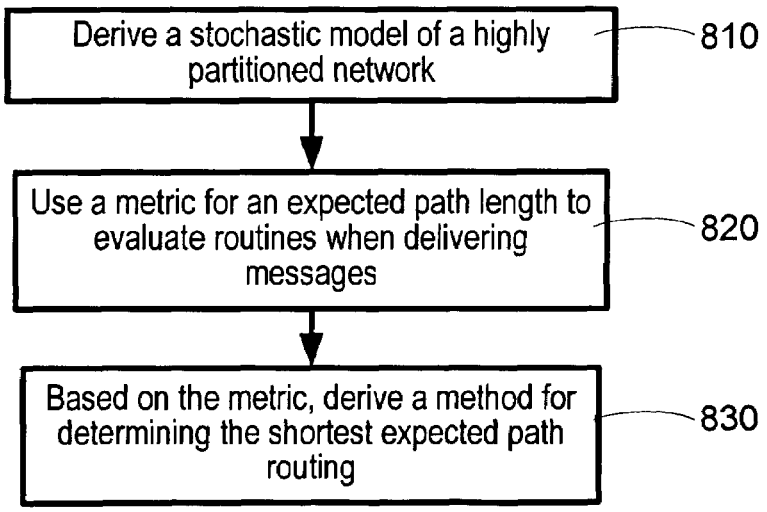
FIG. 8 is a flow diagram illustrating a method in accordance with an embodiment of the present invention.

Referring now to FIG. 8, an embodiment is directed to message routing in a MetaSpace 200 environment. More specifically, because a MetaSpace 200 environment includes a connection topology that varies dynamically, FIG. 8 depicts a message routing method for a dynamically changing topology. Routing methods have been proposed, for example, Vahdat and Becker proposes a method of routing among mobile devices that provides that each node allocate a cache to store messages for other nodes. A. Vahdat and D. Becker, "Epidemic Routing for Partially Connected Ad Hoc Networks," 2000; Technical Report CS-200006, Duke University, April 2000. When two separated nodes meet, an epidemic process is executed in which the two nodes exchange messages that each hold and then carry the same set of messages. The method uses a flooding algorithm and assumes unlimited buffer sizes and time to guarantee eventual message delivery. Vahdat and Becker's method and like methods follow flooding-based algorithms that generate unnecessary messages that occupy cache memory thereby reducing delivery rates.

Devices sending messages in a MetaSpace 200 environment may not know the exact location of the destination. Additionally, devices sending messages may not know the path to the destination. According to the method in the embodiment shown in FIG. 8, the routing protocol in a partially connected network includes making at least two decisions. First, when two devices meet, a decision is made as to which messages are delivered from one to the other. Second, when metadata storage 312 is full on a device, a decision is made as to which messages are going to be removed to make room for new incoming messages. In an embodiment, such decisions are made locally. Further, the routing method according to the embodiment exploits certain structural information of the mobile ad hoc network.

To determine the structural information of the network, FIG. 8 provides in block 810 that a stochastic model of a highly partitioned network is derived. Based on the model, block 820 provides that a metric, hereinafter referred to as an expected path length, is used to evaluate routes for delivering messages. Block 830 provides that, based on the metric, a method for determining the shortest expected path routing is derived.

Figure 9:
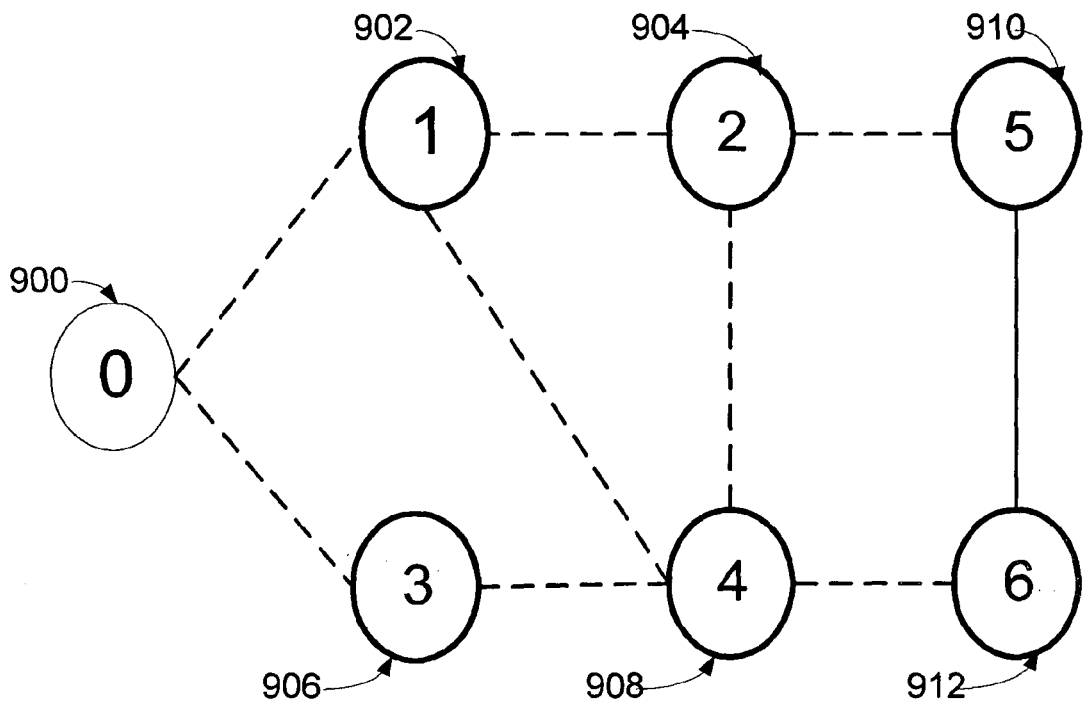
FIG. 9 is a block diagram illustrating interconnected nodes in a partially connected topology and message routing therein in accordance with an embodiment of the present invention.

Referring now to FIG. 9, a stochastic network model according to an embodiment is illustrated. Nodes 0-6, 900-912, respectively, are shown in the model. According to the model, edges with zero connecting probability are removed. The solid line connecting node 5 910 and node 6 912 represents a permanent network connection. The network 900 could be represented by a network of nodes equipped with short-range wireless radio. Communications can go bidirectionally between two nodes if they are in the same vicinity. Assuming that each node has finite memory each node can be configured to carry up to M messages. The message is the information unit that is exchanged between any two nodes.

Assume a complete graph G (V, E) as the stochastic model of ad hoc network 900. Each vertex in V presents one identical node in N. For each edge e i,j in E, we assign a probabilistic weight Pi,j, 0≦Pi≦1, which presents the probability of the existence of a connection between these two nodes. If Pi,j is zero, there is never a chance that node i can communicate to node j directly. If Pi,j is one, there is a permanent connection existing between the two nodes.

Figure 10:
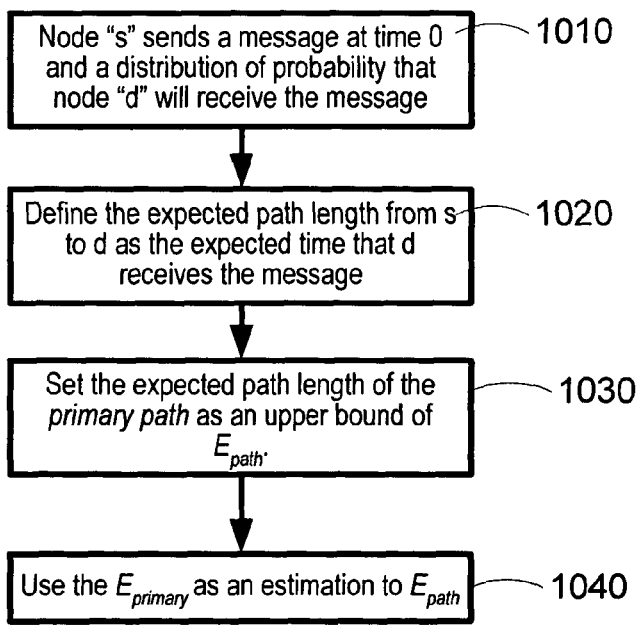
FIG. 10 is a flow diagram illustrating a method of determining an estimation of a path for a message in a partially connected network in accordance with an embodiment of the present invention.

Referring now to FIG. 10, a flow diagram illustrates a method for determining a shortest expected path. More particularly, consider a pair of nodes <s, d>, where s is the source and d is the destination. Block 1010 provides that node s sends a message at time 0, and the distribution of probability that d receives the message, represented as II. II can be determined by the topology of the stochastic network model, as described above. Block 1020 provides for defining the expected path length from s to d as the expected time that d receives the message, as shown in equation 1:

$$E(T) = E_{path} = \sum_{t=1}^{\infty} t \cdot \prod(t) \qquad \text{Equation 1}$$

In MetaSpace, 200, multiple copies of the message can be sent following multiple paths. Hereinafter, the path with the shortest expected path length shall be referred to as the primary path. Block 1030 provides for setting the expected path length of the primary path as an upper bound of $E_{path}$. The expected path length of the primary path can be derived from equation 2:

$$E_{path} \approx E_{primary} = \sum_{i \in P_{primary}} \frac{1}{p_i}. \qquad \text{Equation 2}$$

where $p_i$ is the connection probability of link i on the primary path. Block 1040 provides for using the $E_{primary}$ as an estimation to $E_{path}$. To determine the estimation, first the expected path length of any node pair <s, d> is calculated by determining the primary path between those two nodes. Next, weight $p_i$ is replaced on the link of the stochastic network model with $1/p_i$, and then the known Dijkstra algorithm is performed to get $E_{primary}(s,d) \approx E_{path}(s,d)$. In an embodiment, each node must have a full topology of the stochastic network model. The building up and maintenance of the topology can be, in one embodiment, in some ways being similar to link-state routing, like known protocol as open shortest path first (OSPF) protocol which distributes routing information between routers belonging to a single network having a goal as finding the least cost path from one node to all other nodes.

Referring now to FIG. 11, an embodiment of a method for determining the shortest expected path routing is illustrated in a flow diagram. The method is based on the expected path length metric described above. Block 1110 provides that each message in a device's metadata storage 312 is assigned with an effective path length, $EPL_m$. Block 1120 provides that the effective path length is reset to infinite when the device receives a new message. Block 1130 provides that if the message is propagated to another device, the EPL is updated as the expected path length from the target device to the destination of the message. In pseudo-code, the routing method can be described as follows:

TABLE 3

When device A connects to device B
    For each message M that B is interested but unknown to B, do
        D = destination of M
        If Epath (B, D) < min ( Epath (A, D) , EPL m (A) ), then
            Transfer M from A to B
            EPLm (A) = Epath (B, D)
        End if
    End for
When device A receives message M but the storage is full
    M' = message in storage with minimum EPL, which is not infinite
    If M' is nil, then
        M' = message in storage with maximum expected path length
    End if
    Replace M' with M The method illustrates that it is useless to propagate a message to one device if it has little chance to deliver it to destination; and that when purging cache for new message, these have been delivered with high probability are preferential.

MetaSpace 200 includes an application programming in proxy_dll 308 which bridges between the application and the MetaSpace 200 middleware. In an embodiment, there are four major classes of functions, as shown in table 4

TABLE 4

// Class 1 : Initialization and Deinitialization
BOOL Initialize        ( DWORD dwReserved = 0 );
BOOL Uninitialize      ( void );
// Class 2 : Read/write on MetaSpace
BOOL Write          (CMetadata&Metadata);
BOOL Take           (DWORD dwLocalMsgID,CMetadata&
                          Metadata );
BOOL Read           (DWORD dwLocalMsgID,CMetadata&
                          Metadata );
BOOL EnumMetadata    ( DWORD &id, CMetadata&Metadata );
// Class 3 : Event registration
DWORD Register       ( HWND hWnd,CString&sAppPort );
BOOL Unregister      ( DWORD regID );
// Class 4 : Namespace operation
BOOL SetInterests     ( CString &sInterest );
BOOL SetExport        ( CString &sInterest );
BOOL EnumInterests   ( DWORD &id, CString &sInterest );
BOOL EnumExports    ( DWORD &id, CString &sExport );
BOOL GetInterest      ( DWORD id, CString &sInterest ) ;
BOOL GetExport        ( DWORD id, CString &sExport );
BOOL RemoveInterest     ( DWORD id ) ;
BOOL RemoveExport      ( DWORD id ) ;

MetaSpace basic operations covered by application programming interfaces (APIs) include a write, read, enumerate and search.

The Write function provides that all applications call a write (spaceid, metadata) to insert metadata into a MetaSpace environment. Metadata can be wrapped into SOAP-messages or a similar type of message. Each of the messages is assigned to a globally unique message identifier.

The Read function provides for two forms of function calls for applications to read metadata in the MetaSpace. A first form of function call is take (msgid, MetaData*metadata ), which reads out the metadata and removes that data from MetaSpace. A second form of function is read (msgid, MetaData*metadata), which removes the data and leaves the metadata unchanged.

The Enumerate and Search function provides that metadata stored in the MetaSpace can be enumerated by calling enum_metadata (spaceid, template), which returns a enum_info structure that applications can use to read all enumerated metadata. Template provides selective criteria that define which metadata are to be enumerated. If a NULL is provided, the function returns all metadata currently stored.

MetaSpace event registration is also covered by APIs. Namely, APIs for registration and deregistration are provided.

The Register function provides that an application can register a handler that handles certain event, such as a certain type of message arrived or a certain device is connected. The register system call is, register (spaceid, event_type, template, handler). The template specifies a filter that applies to select when certain type of event occurs. For example, when event "receiving a message" occurs, a template can specify that the handler is only called when the message is sent from a certain person. The function returns a reg_jd that can be further used to unregister the event.

The Unregister function provides that an application can remove pre-registered event-handler by call unregister (reg_id) system call.

MetaSpace also provides for at least three namespace operation APIs. The Sub-space create and remove function provides that an application can create any sub-space in the MetaSpace. A system call, create(spacename) is to create a sub-space in current metaspace. The spacename is unique identify to a sub-space. Remove(spacename) system call is called to remove a sub-space. Note that these two system calls are only provided to privileged applications.

The Space export and import function allows applications to set which sub-space(s) that they are interested in sharing with other devices. An application calls set_interest(spaceid) to receive messages from others in a sub-space. An application calls set_export(spaceid), if the application is to transmit messages in the sub-space to other devices.

The Enumerate sub-space function provides that a sub-space in MetaSpace can be enumerated by calling the enum_space(template) function. The template specifies the selective criteria that sub-spaces associated with an application want to enumerate, e.g., all sub-spaces under a sub_spaces named "my_family", all sub-spaces that have been exported, or all sub-spaces that contain a keyword "news", etc.

In view of the many possible embodiments to which the principles of this invention can be applied, it will be recognized that the embodiment described herein with respect to the drawing figures is meant to be illustrative only and are not be taken as limiting the scope of the invention. For example, those of skill in the art will recognize that the elements of the illustrated embodiment shown in software can be implemented in hardware and vice versa or that the illustrated embodiment can be modified in arrangement and detail without departing from the spirit of the invention. Therefore, the invention as described herein contemplates all such embodiments as can come within the scope of the following claims and equivalents thereof.

In view of the many possible embodiments to which the principles of this invention can be applied, it will be recognized that the embodiment described herein with respect to the drawing figures is meant to be illustrative only and are not be taken as limiting the scope of invention. For example, those of skill in the art will recognize that the elements of the illustrated embodiment shown in software can be implemented in hardware and vice versa or that the illustrated embodiment can be modified in arrangement and detail without departing from the spirit of the invention. Therefore, the invention as described herein contemplates all such embodiments as can come. within the scope of the following claims and equivalents thereof.

We claim:

1. A middleware communication space enabling coordination of one or more distributed applications stored on computer readable storage media in a partially connected ad hoc wireless network, the middleware comprising:
   a proxy component stored on computer readable storage media and configured to receive data from the one or more distributed applications;
   a protocol agent stored on computer readable storage media and coupled to the proxy component, the protocol agent configured to monitor metadata for transport and to govern asynchronous transport of messages in the partially connected ad hoc network wherein the protocol agent connects to one network at a time;
   a metadata storage component stored on computer readable storage media and coupled to the proxy component and the protocol agent, the metadata storage component configured to store metadata capable of being transported as a message according to the one or more distributed applications, the middleware communication space providing an asynchronous bridge between two or more partially-connected networks, the bridge enabling temporary storage of the messages to enable transparent messaging between two or more devices;
   a discovery component stored on computer readable storage media and coupled to the protocol agent to determine one or more neighbor devices according to a listen and announce protocol;
   a choosing component stored on computer readable storage media and coupled to the discovery component to choose a neighbor device for receipt of one or more messages, the choosing comprising:
      deriving a stochastic model of the dynamically changing topology;
      using the stochastic model, evaluating routes for delivering the messages according to the expected path length;
      determining a shortest expected path route from the evaluated routes; and
   delivering messages to another device to propagate messages between the networks.

2. The middleware communication space of claim 1 wherein the message is in one or more of a SOAP format and a WS series protocol format.

3. The middleware communication space of claim 1 wherein the middleware storage component holds a plurality of the messages in eXtended Markup Language (XML), the messages in a hierarchical structure.

4. The middleware communication space of claim 1 wherein the metadata includes: web service routing protocol (WS-Routing) data that defines routing data; and data appropriate for an extended protocol to provide processing information for the protocol agent.

5. The middleware communication space of claim 1 wherein the middleware communication space provides one or more of message caching, transferring and routing.

6. The middleware communication space of claim 1 wherein the messages are organized into a plurality of data fields including at least one or more of:
   an expiration time data field identifying the expiration of the message in absolute time such that data arc invalid after the identified time;
   a hop limitation data field providing an tipper bound of hops that a message can be transferred, the upper bound decreasing by one after a successful transmission;
   a timestamp data field providing a absolute time marking creation time of the message;
   a namespace data field identifying a subspace in which the message is placed;
   an administration domain data field identifying a domain to which the message is restricted, the administration domain data field defining a physical bound of devices which share a same administration privilege;
   a relatedness data field specifying a topic to which the message is related, the relatedness providing a relationship attribute to define an action when two or more messages are related to the topic;
   a priority data field defining a priority of the message; and
   a property data field providing an extensible component for the distributed application to define application-specific properties with the message.

7. The middleware communication space of claim 6 wherein the messages are organized into at least three of the data fields.

8. The middleware communication space of claim 6 wherein the messages are organized into at least six of the data fields.

* * * * *

UNITED STATES PATENT AND TRADEMARK OFFICE
CERTIFICATE OF CORRECTION

PATENT NO.         : 7,523,220 B2
APPLICATION NO.    : 10/664354
DATED              : April 21, 2009
INVENTOR(S)        : Kun Tan et al.

Page 1 of 1

It is certified that error appears in the above-identified patent and that said Letters Patent is hereby corrected as shown below:

In column 14, line 20, in Claim 6, delete "arc" and insert -- are --, therefor.

In column 14, line 22, in Claim 6, delete "tipper" and insert -- upper --, therefor.

Signed and Sealed this
Third Day of May, 2011

David J. Kappos
*Director of the United States Patent and Trademark Office*